(12) United States Patent
Tashiro

(10) Patent No.: US 8,792,769 B2
(45) Date of Patent: Jul. 29, 2014

(54) DISPLAY PROCESSING APPARATUS AND METHOD, AND STORAGE MEDIUM

(71) Applicant: Canon Kabushiki Kaisha, Tokyo (JP)

(72) Inventor: Masanori Tashiro, Funabashi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/715,154

(22) Filed: Dec. 14, 2012

(65) Prior Publication Data

US 2013/0183020 A1 Jul. 18, 2013

(30) Foreign Application Priority Data

Jan. 12, 2012 (JP) .................... 2012-004463

(51) Int. Cl.
*H04N 5/77* (2006.01)
*H04N 5/84* (2006.01)
*H04N 5/89* (2006.01)
*H04N 7/14* (2006.01)
*H04N 7/00* (2011.01)
*H04N 5/253* (2006.01)
*H04N 5/225* (2006.01)

(52) U.S. Cl.
USPC .......... 386/225; 386/333; 348/14.14; 348/22; 348/24; 348/110; 348/220.1

(58) Field of Classification Search
USPC ........... 386/225, 333; 348/14.14, 22, 24, 110, 348/220.1
See application file for complete search history.

(56) References Cited

U.S. PATENT DOCUMENTS

2003/0202777 A1* 10/2003 Kogusuri .................... 386/95
2009/0180697 A1* 7/2009 Erol et al. .................. 382/218

FOREIGN PATENT DOCUMENTS

JP 2002-142191 A 5/2002

* cited by examiner

*Primary Examiner* — Daquan Zhao
(74) *Attorney, Agent, or Firm* — Fitzpatrick, Cella, Harper & Scinto

(57) ABSTRACT

A display processing apparatus acquires a plurality of images and time data corresponding to the respective images. The display processing apparatus selects, as the time interval at which the plurality of images are switched and displayed one by one, either a time interval based on the difference between time data corresponding to images before and after switching, or a predetermined interval. The display processing apparatus switches the plurality of images at the selected time interval, and displays them on a display device.

18 Claims, 10 Drawing Sheets

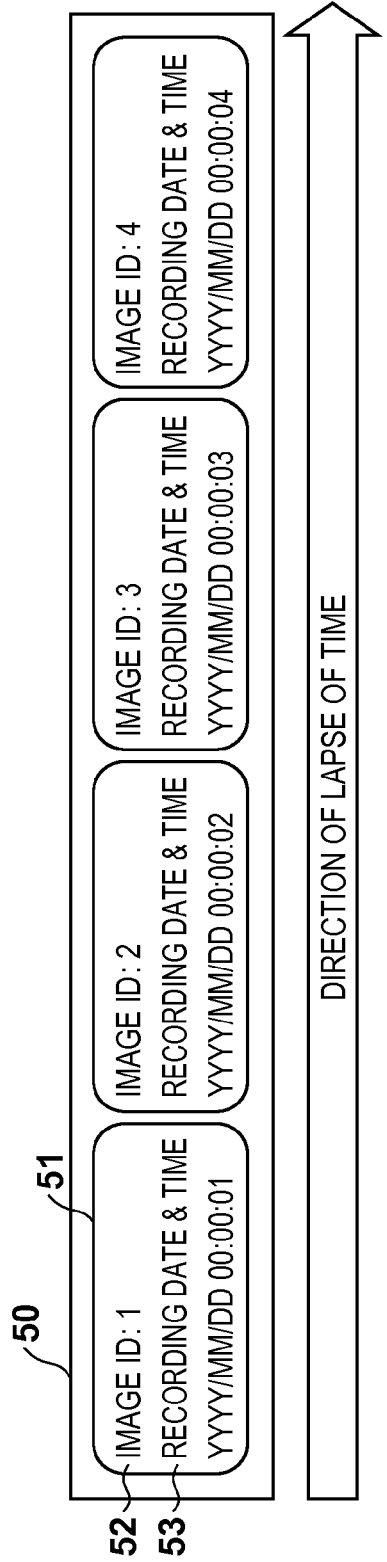
F I G. 5A
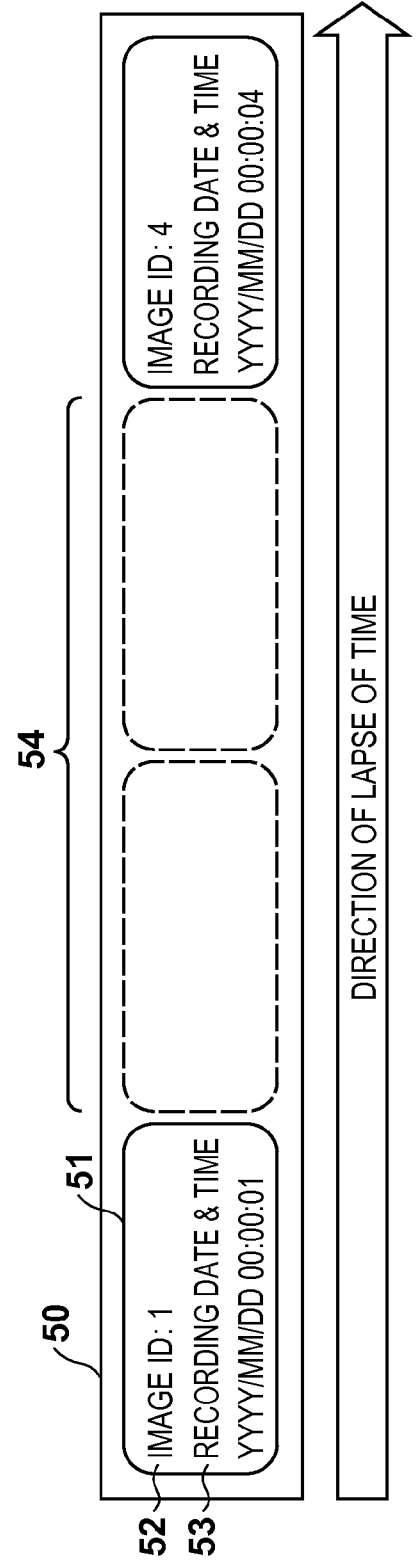
F I G. 5B

DISPLAY PROCESSING APPARATUS AND METHOD, AND STORAGE MEDIUM

BACKGROUND OF THE INVENTION

1. Field of the Invention

The present invention relates to a display processing apparatus, method, and storage medium.

2. Description of the Related Art

As a method of playing back still images captured by a camera or the like, a slide show function of automatically switching and displaying images at a predetermined interval has conventionally been known. This function continuously plays back a plurality of still images by switching and displaying images at even intervals designated in advance.

There is also known a technique of recording time information together with a still image captured by a camera or the like, and automatically switching and displaying images at intervals based on pieces of time information. For example, Japanese Patent Laid-Open No. 2002-142191 discloses a technique in which time information recorded together with an image is recorded in correspondence with the image in an image server, and images are transferred to a receiving terminal at transmission intervals based on pieces of time information.

A case in which still images whose image recording dates & times are temporally discontinuous are continuously played back by the technique disclosed in Japanese Patent Laid-Open No. 2002-142191 will be examined. In this case, if the continuous playback is executed at actual time intervals of capturing, the user has to wait for a long time until images are switched.

SUMMARY OF THE INVENTION

According to one aspect of the present invention, there is provided a technique of playing back a plurality of images at an appropriate playback interval.

According to one aspect of the present invention, there is provided a display processing apparatus comprising: an acquisition unit configured to acquire a plurality of images and time data corresponding to the respective images; a selection unit configured to select, as a time interval at which the plurality of images are switched and displayed one by one, one of a time interval based on a difference between time data corresponding to images before and after switching, and a predetermined interval; and a processing unit configured to switch the plurality of images at the time interval selected by the selection unit, and display the plurality of images on a display device.

According to another aspect of the present invention, there is provided a display processing apparatus comprising: an acquisition unit configured to acquire an image and a recording time from an image capture apparatus configured to capture an image; a selection unit configured to select, as a time interval at which a plurality of images are switched and displayed one by one, one of a time interval based on a difference between recording times of images before and after switching, and a predetermined interval; and a processing unit configured to switch the plurality of images at the time interval selected by the selection unit, and display the plurality of images on a display device.

Further features of the present invention will be apparent from the following description of exemplary embodiments with reference to the attached drawings.

BRIEF DESCRIPTION OF THE DRAWINGS

FIGS. 5A and 5B are views showing an outline of continuous playback;

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

Figure 1:
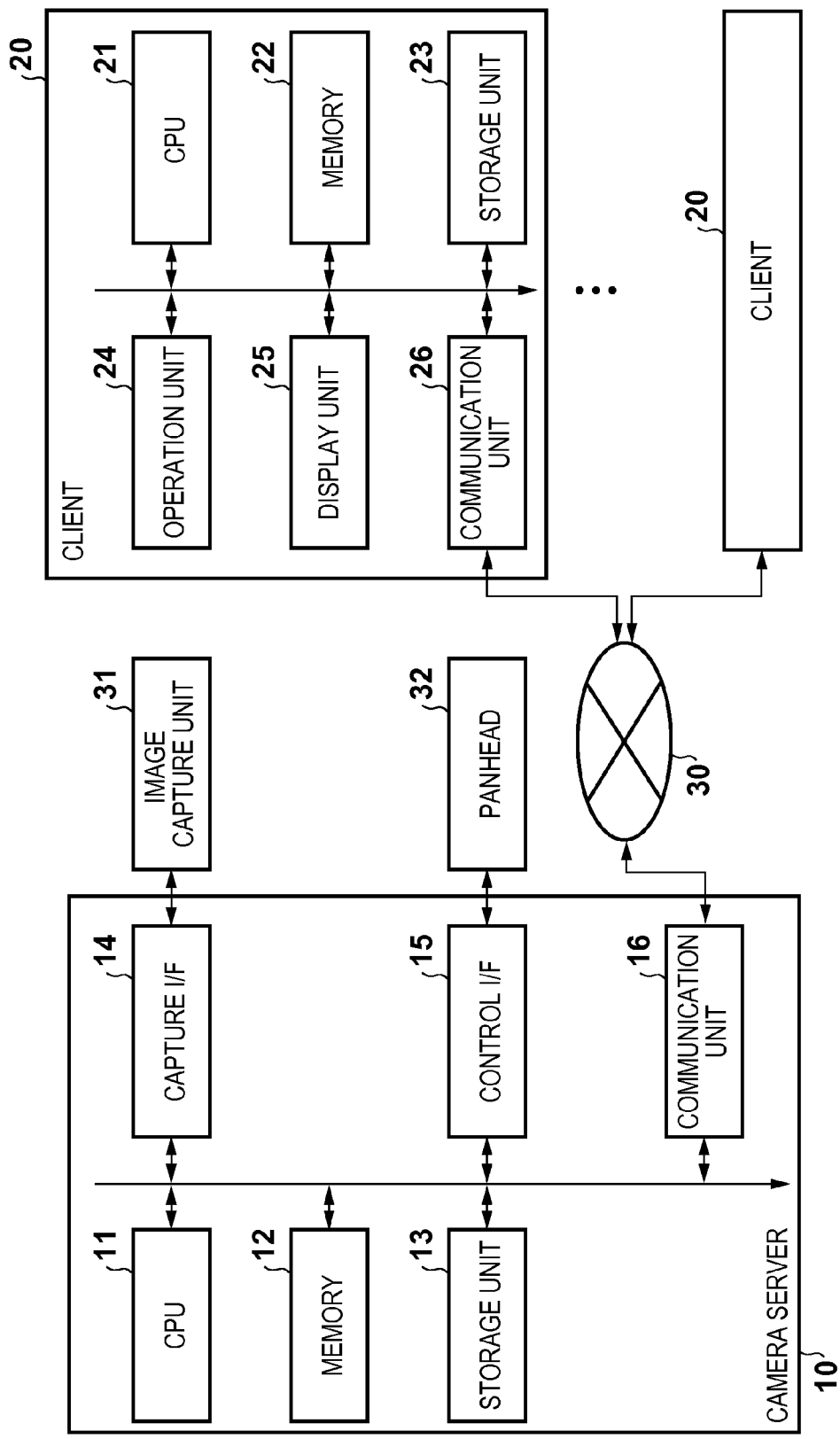
FIG. 1 is a block diagram exemplifying the configuration of an image playback system in which an information processing apparatus is arranged as a client according to an embodiment of the present invention.

FIG. 1 is a block diagram exemplifying the configuration of an image playback system in which an information processing apparatus is arranged as a client according to an embodiment of the present invention.

In the image playback system, a camera server 10 and a plurality of clients 20 are connected via a network 30 such as a LAN (Local Area Network) or WAN (Wide Area Network) so that they can communicate with each other. The camera server 10 and the plurality of clients 20 need not always be connected by a network, but may be connected by a USB (Universal Serial Bus) or the like, and the method is arbitrary. Exchange of image data and the like between the camera server 10 and the client 20 may be performed via a portable storage medium. Alternatively, the client 20 may incorporate an image capture unit. The client 20 may be a personal computer, tablet terminal, smartphone, or mobile phone.

The camera server 10 includes a CPU 11, memory 12, storage unit 13, capture I/F 14, control I/F 15, and communication unit 16.

The CPU 11 performs overall control of various processes in the camera server 10. The memory 12 is formed from, for example, a RAM (Random Access Memory) and ROM (Read Only Memory). Processing in the camera server 10 is performed by, for example, loading and executing a program stored in the ROM or the storage unit 13 by the CPU 11 using the memory 12 as a work area.

The storage unit 13 is formed from, for example, a hard disk drive, and stores various programs (for example, an application and OS) and the like.

The capture I/F 14 is a communication interface with an image capture apparatus (for example, a camera) 31. The capture I/F 14 converts an image captured by the image capture apparatus 31 into a predetermined format, compresses the converted image, and stores the compressed image in the memory 12 or the like. The camera server 10 and image capture apparatus 31 may be integrated. The CPU 11 manages the current date & time. When storing an image captured by the image capture apparatus 31 in the memory 12, the CPU 11 also stores, in the memory 12, a frame number and capturing date & time (recording date & time) added to the captured image.

The control I/F 15 is a communication interface with a panhead 32. The control I/F 15 acquires the states of the pan mechanism, tilt mechanism, and rotation mechanism of the panhead 32, and controls the panhead 32. Note that the present invention is not limited to an apparatus capable of changing the capturing direction.

The communication unit 16 is a communication interface for communicating with an external apparatus (for example, the client 20). The camera server 10 performs, for example, transmission/reception of images to/from each client 20 via the communication unit 16.

The client (information processing apparatus) 20 includes a CPU 21, memory 22, storage unit 23, operation unit 24, display unit 25, and communication unit 26. The CPU 21, memory 22, storage unit 23, and communication unit 26 have the same functions as those of corresponding units arranged in the camera server 10, and a description thereof will not be repeated.

The operation unit 24 is formed from, for example, a mouse and keyboard, and inputs various instructions from the user into the apparatus. The display unit (display device) 25 is formed from, for example, a display, and displays various kinds of information to the user.

Figure 2:
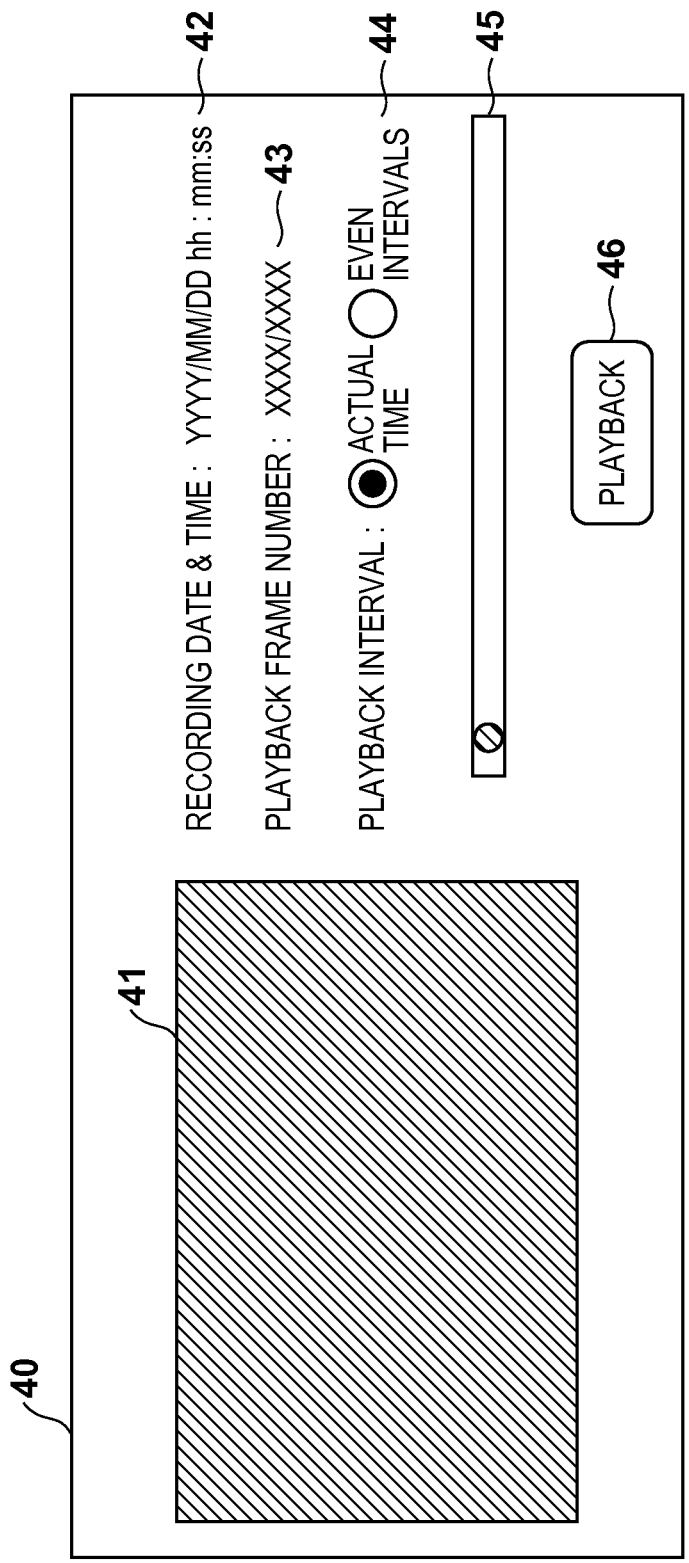
FIG. 2 is a view exemplifying a playback screen.

FIG. 2 is a view exemplifying a playback screen displayed in the client (information processing apparatus) 20. This screen is displayed by, for example, loading and executing a playback tool (application) stored in the storage unit 23 by the CPU 21.

A playback screen 40 is used when images stored in the storage unit 23 of the client 20 or the storage unit 13 of the camera server are switched one by one to perform continuous playback (slide show display).

The playback screen 40 includes an image display area 41, recording date & time 42, playback frame number 43, playback interval selection radio button 44, slider bar 45, and playback button 46.

The image display area 41 is an area where continuously played-back images are displayed. The recording date & time 42 is an area where the recording time of an image displayed in the image display area 41 is displayed. The playback frame number 43 is an area where the total number of images and the number of an image currently displayed in the image display area 41 are displayed. The playback interval selection radio button 44 is a radio button (exclusive selection) for selecting the playback interval of images. As the playback interval, the actual time and even intervals are provided to be selectable. In this case, the actual time is selected.

The slider bar 45 is an area where the position of an image currently displayed among a plurality of images is displayed. The playback button 46 is a button for designating the start of continuous playback of images.

When the user presses the playback button 46 via the mouse or the like (operation unit 24), the client 20 continuously plays back, in the image display area 41, images stored in the storage unit 23 or storage unit 13 one by one in ascending order of the recording time at a playback interval selected by the playback interval selection radio button 44. Along with the continuous playback, the value of the playback frame number 43 and/or the position of the slider bar 45 change appropriately. Further, time information corresponding to an image currently displayed in the image display area 41 is appropriately switched and displayed as the recording date & time 42. After playing back all images, the continuous playback stops.

When the actual time (first playback method or first playback mode) is selected by the playback interval selection radio button 44, the image display is switched with the lapse of time complying with actual time information of the recording time of an image currently displayed in the image display area 41 and the recording time of an image to be displayed next. That is, the image displayed in the image display area 41 is not switched till the lapse of time complying with actual time information of the recording time of an image currently displayed and the recording time of an image to be displayed next.

When the even intervals (second playback method or second playback mode) are selected by the playback interval selection radio button 44, images are switched and displayed in the image display area 41 every time a predetermined time elapses, regardless of the recording time (that is, time information) of the image.

Figure 3:
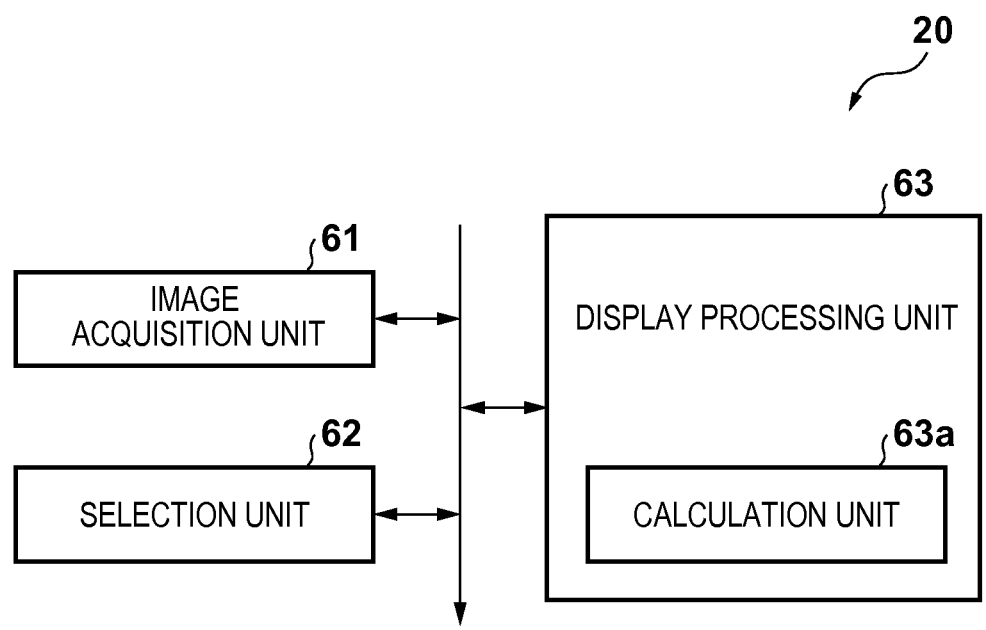
FIG. 3 is a block diagram exemplifying a functional arrangement implemented in a client 20.

Next, an example of a functional arrangement implemented in the client (information processing apparatus) 20 shown in FIG. 1 will be explained with reference to FIG. 3.

The client 20 includes, as its functional arrangement, an image acquisition unit 61, selection unit 62, and display processing unit 63. The image acquisition unit 61 acquires a plurality of images to undergo continuous playback.

In continuous playback of a plurality of images, the selection unit 62 selects a playback method (actual time or even intervals). This selection is made based on a selection by the playback interval selection radio button 44 described with reference to FIG. 2.

The display processing unit 63 controls the display of various screens. The display processing unit 63 includes a calculation unit 63*a* which calculates a playback interval used when switching and displaying a plurality of images.

Figure 4:
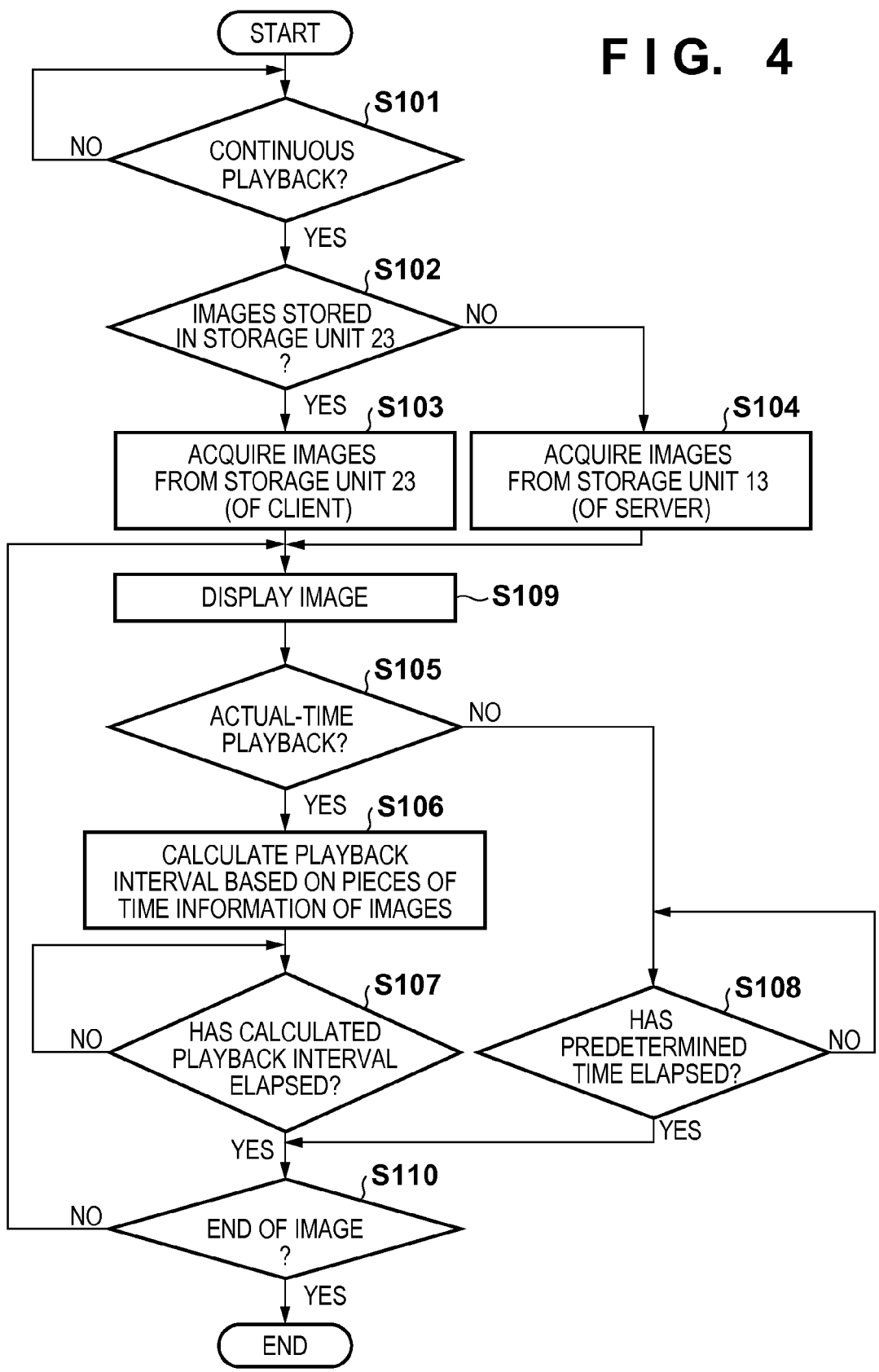
FIG. 4 is a flowchart exemplifying a processing sequence in the client 20.

An example of a processing sequence in the client (information processing apparatus) 20 shown in FIG. 1 will be described with reference to FIG. 4. A processing sequence when the user presses the playback button 46 in the playback screen 40 described with reference to FIG. 2 will be explained. This flowchart is part of a program to be executed by the CPU 21 serving as a computer. This program is stored in the storage unit 23 so that the CPU 21 can read it out.

When the user presses the playback button 46 via the mouse or the like (operation unit 24), the process starts (YES in step S101). After the start of the process, the client 20 controls the image acquisition unit 61 to determine whether images are stored in the storage unit 23. If images are stored (YES in step S102), the client 20 controls the image acquisition unit 61 to acquire a plurality of images from the storage unit 23 (step S103). If no image is stored (NO in step S102), the client 20 controls the image acquisition unit 61 to request the camera server 10 via the communication unit 26 to acquire images. As a response, the client 20 controls the image acquisition unit 61 to acquire a plurality of images from the server 10 (step S104). Assume that a frame number and time information (recording date & time) are added to each of these acquired images. If no image has been acquired from the client 20 and camera server 10, the process ends due to an error. A situation in which no image is stored in the storage unit 23 may be determined as an error. Whether images are stored in the storage unit 13 may be determined without determining whether images are stored in the storage unit 23. Before pressing the playback button 46, a folder which stores images to be played back may be designated to determine whether images are stored in the folder.

After acquiring images, the client 20 controls the display processing unit 63 to display the first image in the image display area 41 (step S109). Then, the client 20 controls the selection unit 62 to select a playback interval used when continuously playing back images. As described above, this selection is made based on the playback interval selection radio button 44 described with reference to FIG. 2.

If even intervals are selected as the playback interval (NO in step S105), the client 20 waits till the lapse of a predetermined time after display of the image in step S109 (NO in step S108). The playback interval in this case is even intervals. If the predetermined time has elapsed (YES in step S108), the client 20 determines whether all images have been displayed. If all images have been displayed (YES in step S110), the client 20 ends the process. If there is an undisplayed image (NO in step S110), the client 20 returns again to the processing of step S109 to display the next image.

If the client 20 determines in step S105 that the actual time is selected as the playback interval (YES in step S105), it controls the calculation unit 63a to calculate, based on pieces of time information (recording dates & times) of images, a playback interval until the image is switched to the next one to display it (step S106). More specifically, the difference between time information of an image currently displayed and that of an image to be displayed next is obtained as the playback interval. The client 20 waits till the lapse of the calculated playback interval (NO in step S107). The playback interval in this case is the actual time.

If the calculated playback interval has elapsed (YES in step S107), the client 20 determines whether all images have been displayed. If all images have been displayed (YES in step S110), the client 20 ends the process. If there is an undisplayed image (NO in step S110), the client 20 returns again to the processing of step S109 to display the next image.

As described above, according to the embodiment, when continuously playing back a plurality of images, even intervals or the actual time can be selected as the playback interval. It can therefore be selected to display temporally discontinuous images at even intervals, and display temporally continuous images in the actual time.

This can suppress generation of an unnecessary waiting time in continuous playback of a plurality of images, improving user friendliness.

An automatic mode (third playback method) in which the playback interval is automatically switched between actual-time playback and even-interval playback based on time information associated with an image may be set. A case in which this mode is set will be explained below.

First, a case in which a plurality of images having temporally continuous or discontinuous recording times (pieces of time information) are played back will be described with reference to FIGS. 5A and 5B. FIG. 5A shows a video 50 containing a plurality of images having temporally continuous recording times. FIG. 5B shows a video 50 containing a plurality of images having temporally discontinuous recording times.

The video 50 contains a plurality of images. For each image, an image ID 52 and recording date & time 53 are held in correspondence with the image. The image ID 52 is a unique number in the video 50, and serial numbers are set in this case. The recording date & time 53 indicates, for example, the date & time when the capture I/F 14 of the camera server 10 converted an image captured by the image capture apparatus 31 into a predetermined format, and compressed the converted image. In this case, year, month, day, time, minute, and second are held.

As described above, FIG. 5B shows a case in which the video 50 is formed from a plurality of images having discontinuous recording dates & times. Reference numeral 54 denotes a time blank in which no image exists.

Figure 6:
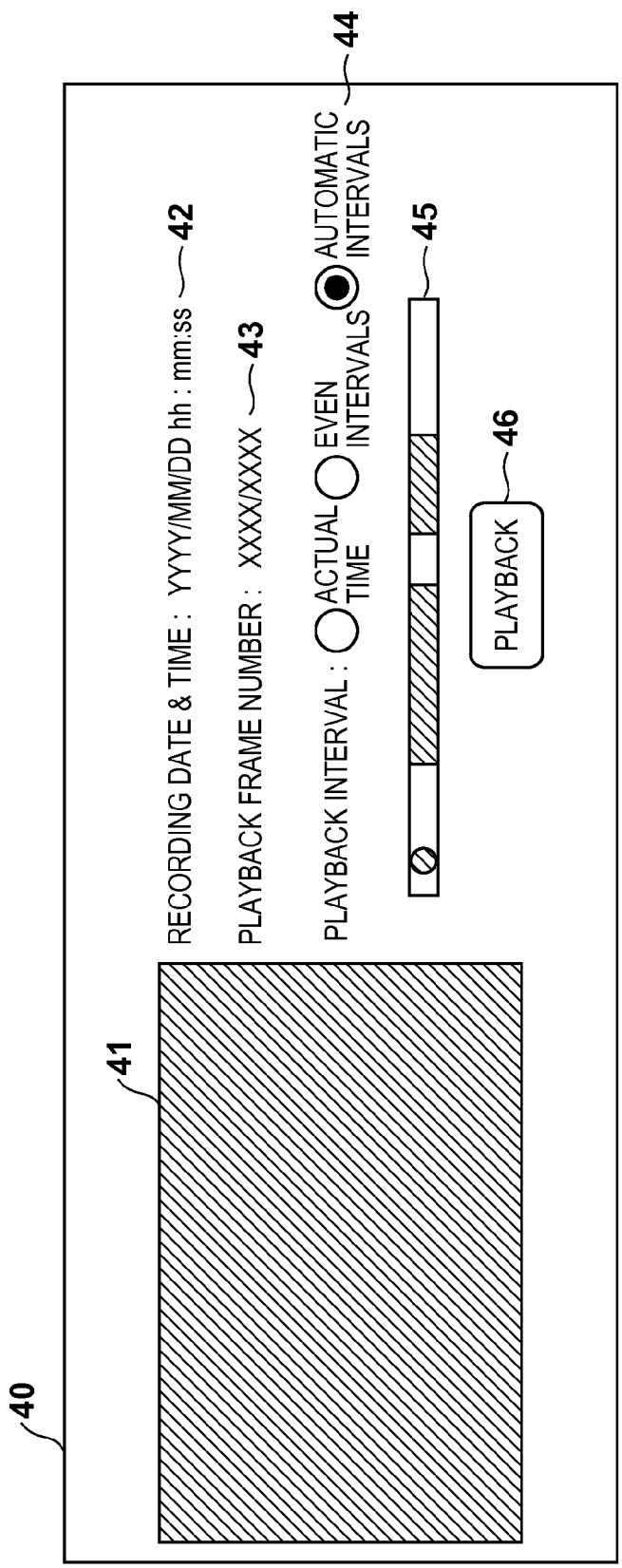
FIG. 6 is a view exemplifying a playback screen.

An example of a playback screen when the automatic mode is set will be explained with reference to FIG. 6. The arrangement except for the playback interval selection radio button 44 and slider bar 45 is the same as that in FIG. 2, and a description thereof will not be repeated.

The playback interval selection radio button 44 newly includes a radio button for selecting automatic intervals in addition to the actual time and even intervals.

The slider bar 45 is color-coded and displayed so that, when the playback interval is changed from even intervals to the actual time during continuous playback, the user can visually recognize this.

When automatic intervals are selected as the playback interval and the difference in time information between images (already displayed image and an image to be displayed next) is smaller than a predetermined time, the playback interval is switched to actual-time playback (automatically), the slider bar 45 is filled in color, and images are played back. When the difference in time information between images is equal to or larger than the predetermined time, the playback interval is switched to even-interval playback (automatically), and images are played back without changing the color of the slider bar 45 (same color as that for a no-playback period). For example, the slider bar 45 is displayed in red during an actual-time playback period and blue during an even-interval playback period. To the contrary, the slider bar 45 may be filled in color during an even-interval playback period. The playback interval is repetitively changed until the end of displaying all images.

Figure 7:
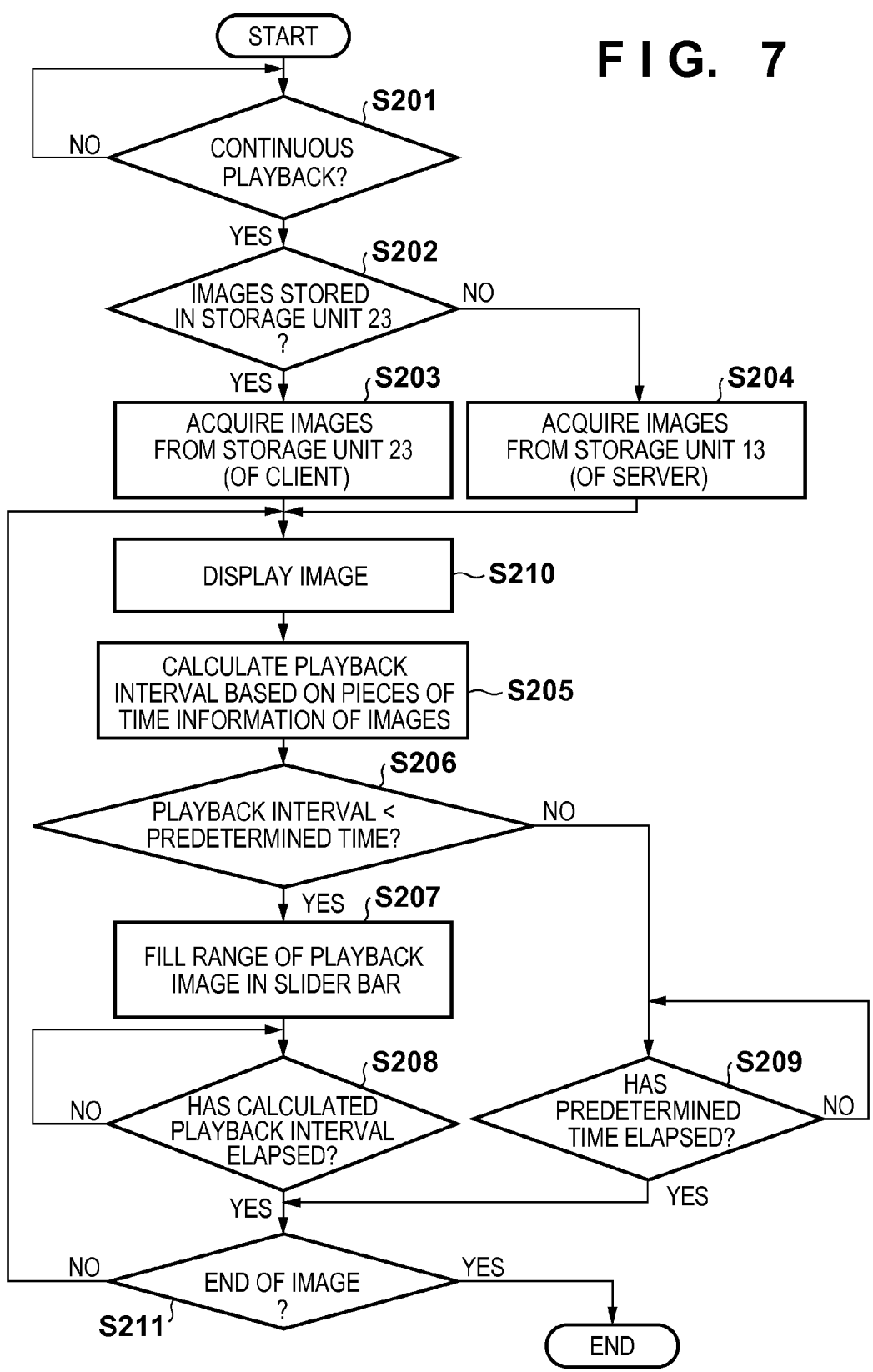
FIG. 7 is a flowchart exemplifying a processing sequence in the client 20.

An example of a processing sequence in the client 20 when the automatic mode is set will be described with reference to FIG. 7. A processing sequence when the user presses the playback button while selecting automatic intervals in the playback screen described with reference to FIG. 6 will be explained. Processing when the actual time or even intervals are selected as the playback interval is the same as that described with reference to FIG. 4, and a description thereof will not be repeated.

When the user presses the playback button 46 via the mouse or the like (operation unit 24), the process starts (YES in step S201). After the start of the process, the client 20 controls the image acquisition unit 61 to determine whether images are stored in the storage unit 23. If images are stored (YES in step S202), the client 20 controls the image acquisition unit 61 to acquire a plurality of images from the storage unit 23 (step S203). If no image is stored (NO in step S202), the client 20 controls the image acquisition unit 61 to request the camera server 10 via the communication unit 26 to acquire images. As a response, the client 20 controls the image acquisition unit 61 to acquire a plurality of images from the server 10 (step S204).

After acquiring images, the client 20 controls the display processing unit 63 to display the first image in the image display area 41 (step S210). Then, the client 20 controls the calculation unit 63a to calculate, based on pieces of time information (recording dates & times) of images, a playback interval between the image displayed in step S210 and the next image (step S205).

If the calculated playback interval is equal to or longer than a predetermined time (NO in step S206), the client 20 performs even-interval playback. That is, the client 20 waits till the lapse of the predetermined time after display of the image in step S210 (NO in step S209). The predetermined waiting time is constant regardless of the playback interval calculated in step S205. If the predetermined time has elapsed (YES in step S209), the client 20 determines whether all images have been displayed. If all images have been displayed (YES in step S211), the client 20 ends the process. If there is an undisplayed image (NO in step S211), the client 20 returns again to the processing of step S210 to display the next image.

If the client 20 determines in step S206 that the playback interval is shorter than the predetermined time (YES in step S206), the client 20 performs actual-time playback. In this processing, first, the client 20 controls the display processing unit 63 to fill, in a predetermined color with the lapse of time, a range of the slider bar 45 from the time when an image currently displayed is positioned in the video to the time when an image to be displayed next is positioned in the video (step S207). That is, when actual-time playback is performed, a corresponding range of the slider bar 45 is filled in a predetermined color to notify the user of a change of the playback interval. Then, the client 20 waits till the lapse of the playback interval calculated in the processing of step S205 (NO in step S208).

The client 20 then determines whether all images have been displayed. If all images have been displayed (YES in step S211), the client 20 ends the process. If there is an undisplayed image (NO in step S211), the client 20 returns again to the processing of step S210.

Note that the display color of the slider bar 45 may be switched in accordance with the playback interval of images prior to the start of displaying a plurality of images.

As described above, automatic intervals may be set as a playback interval selection item. When automatic intervals are selected, pieces of time information of images are compared, and which of the actual time and even intervals are selected as the playback interval may be switched based on the time difference.

Hence, the playback interval is automatically switched between the actual time and even intervals, further improving user friendliness.

When the playback method is switched, a corresponding range of the slider bar 45 is filled in a predetermined color. The user can be appropriately notified that the playback method has been switched.

Needless to say, another display may be used to notify the user of switching of the playback method. For example, a message that the playback method has been switched may be displayed in the message field of the playback screen 40.

Next, a case in which, when the playback interval is changed, playback is paused instead of changing the color of a corresponding range of the slider bar 45 will be explained.

Figure 8:
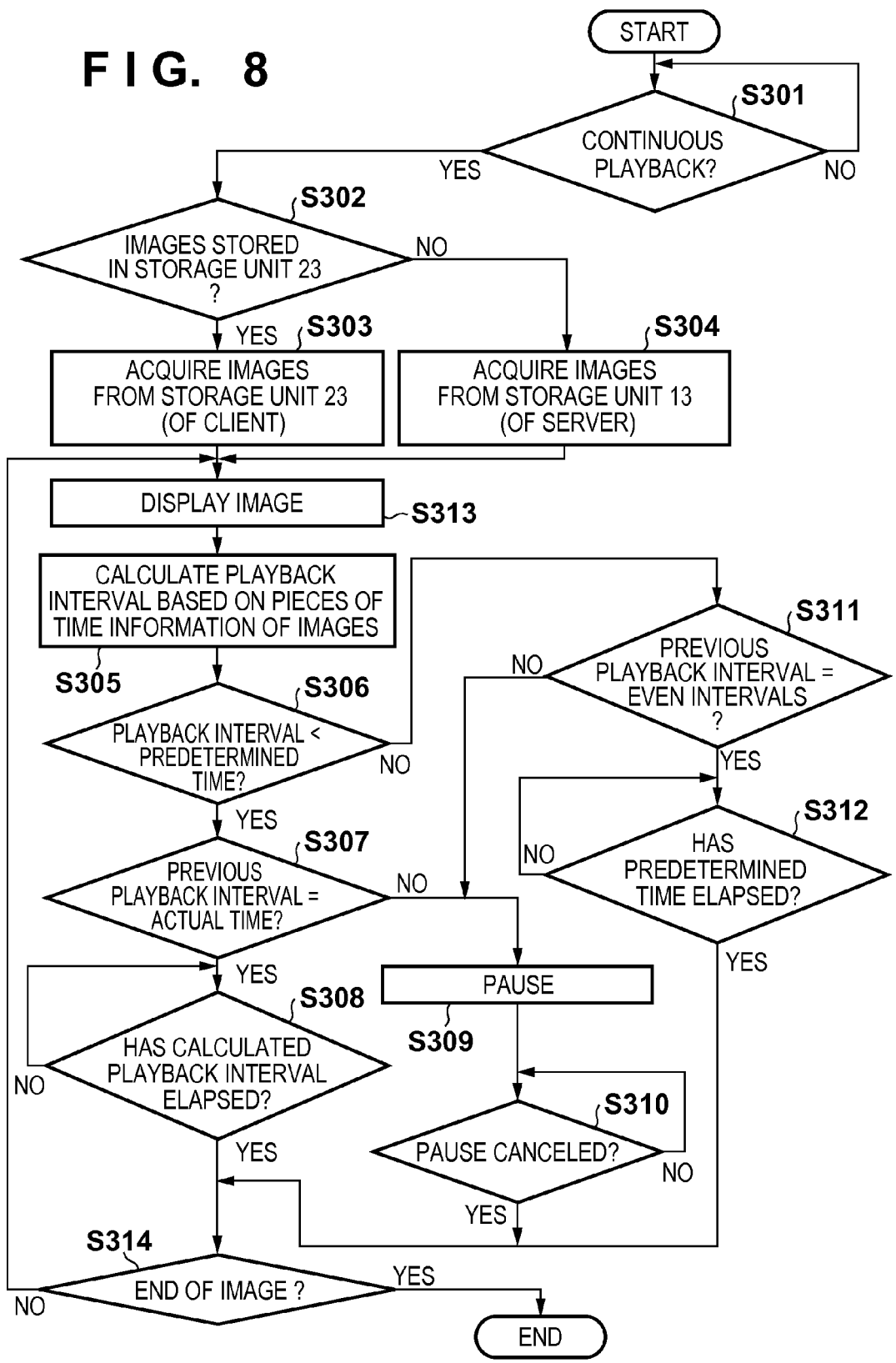
FIG. 8 is a flowchart exemplifying a processing sequence in the client 20.

An example of a processing sequence in the client 20 when playback is paused will be described with reference to FIG. 8. Processes different from those in FIG. 7 will be mainly explained, and a description of the same processes will not be repeated. Since processes in steps S301 to S306 and S313 are the same as those in steps S201 to S206 and S210 of FIG. 7, respectively, processes in step S307 and subsequent steps will be described.

If the client 20 determines in step S306 that the playback interval calculated by the calculation unit 63a is shorter than a predetermined time (YES in step S306), the client 20 controls the display processing unit 63 to determine whether the previous playback interval is the actual time (step S307). If the previous playback interval is the actual time (YES in step S307), and the playback interval calculated in the processing of step S305 has elapsed (YES in step S308), the client 20 determines whether all images have been displayed. If all images have been displayed (YES in step S314), the client 20 ends the process. If there is an undisplayed image (NO in step S314), the client 20 returns again to the processing of step S313, and controls the display processing unit 63 to display the next image in the image display area 41. The playback interval in this case is the actual time.

If the previous playback interval is not the actual time (NO in step S307), the client 20 controls the display processing unit 63 to pause continuous playback (step S309). If the user cancels the pause via the mouse or the like (operation unit 24) (YES in step S310), the client 20 determines whether all images have been displayed (step S314). If there is an undisplayed image (NO in step S314), the client 20 returns again to the processing of step S313, and controls the display processing unit 63 to display the next image in the image display area 41.

If the client 20 determines in step S306 that the playback interval is equal to or longer than the predetermined time (NO in step S306), the client 20 controls the display processing unit 63 to determine whether the previous playback interval is even intervals (step S311). If the previous playback interval is even intervals (YES in step S311), the client 20 waits till the lapse of the predetermined time after the display of the current image (NO in step S312). If the predetermined time has elapsed (YES in step S312), the client 20 determines whether all images have been displayed (step S314). If there is an undisplayed image, the client 20 returns again to the processing of step S313, and controls the display processing unit 63 to display the next image in the image display area 41. The playback interval in this case is even intervals. If the previous playback interval is not even intervals (NO in step S311), the client 20 executes the processes of steps S309 and S310. If there is an undisplayed image after pause (NO in step S314), the client 20 displays the next image (step S313).

As described above, when changing the playback interval, continuous playback is paused. Even in this case, the user can be appropriately notified to change the interval of continuous playback.

Next, an arrangement which allows the user to designate the (total) playback time in even-interval playback will be described.

Figure 9:
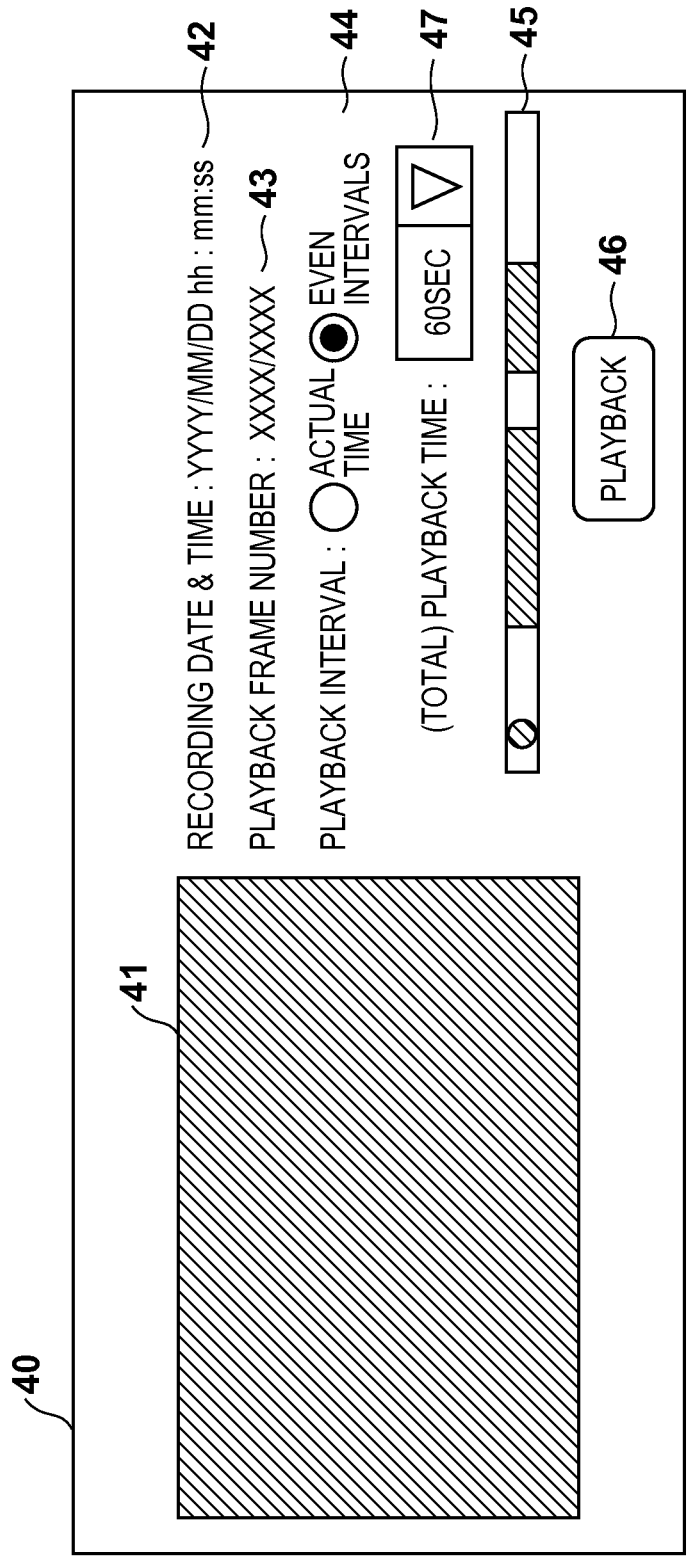
FIG. 9 is a view exemplifying a playback screen.

An example of a playback screen which allows the user to designate the (total) playback time in even-interval playback will be explained with reference to FIG. 9. The arrangement except for a playback time pull-down list 47 is the same as that in FIG. 2, and a description thereof will not be repeated.

The playback time pull-down list 47 is a list for selecting a total playback time. When the user selects even intervals as the playback interval, he designates a total playback time from the list 47. When the actual time is selected as the playback interval, the playback time pull-down list 47 may be protected to inhibit selection.

When the user designates a total playback time from the list 47, the client 20 controls the calculation unit 63a to determine (calculate) a playback interval based on the total number of images to be played back and the total playback time designated from the list 47. The client 20 performs continuous playback at the determined playback interval.

Figure 10:
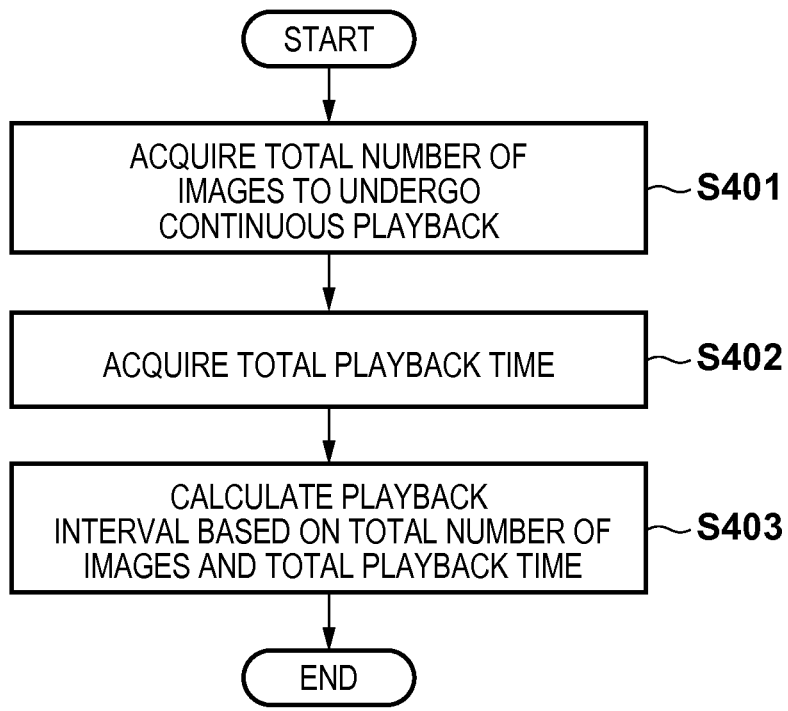
FIG. 10 is a flowchart exemplifying a processing sequence in the client 20.

An example of a processing sequence in the client 20 when the user can designate the (total) playback time in even-interval playback will be described with reference to FIG. 10. A processing sequence when the playback interval is determined upon selecting even intervals as the playback interval will be explained. The remaining processes are the same as those described in the embodiment, and a description thereof will not be repeated.

After the start of the process, first, the client 20 controls the calculation unit 63a to acquire the total number of images to undergo continuous playback (step S401), and acquire the total playback time (step S402). Note that the total playback time is acquired based on information designated in the playback time pull-down list 47 described with reference to FIG. 9.

Then, in step S403, the client 20 controls the calculation unit 63a to calculate a playback interval based on the total number of images acquired in the processing of step S401 and the total playback time calculated in the processing of step S402. The playback interval is obtained by dividing the total playback time by the total number of images. When even intervals are selected as the playback interval, the client 20 controls the display processing unit 63 to switch and display images at the calculated playback interval.

As for the interval in actual-time playback, images may be switched so that the ratio of the recording time interval and the playback time interval becomes constant to end playback of a plurality of target images within the total playback time. For example, when the difference between the recording time of the first image and that of the final image is 10 min and images are displayed in 1 min, the images are switched at the one-tenth interval of the recording time.

As described above, the user can designate the total playback time of continuous playback in even-interval playback, further improving user friendliness.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, a computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-004463 filed on Jan. 12, 2012, which is hereby incorporated by reference herein in its entirety.

What is claimed is:

1. A display processing apparatus comprising:
an acquisition unit configured to acquire a plurality of images and time data corresponding to the respective images;
a selection unit configured to select, as a time interval at which the plurality of images are switched and displayed one by one, one of a time interval based on a difference between time data corresponding to images before and after switching, and a predetermined interval and to display on a display device whether the plurality of images are switched and displayed at the time interval based on the difference between the time data corresponding to images before and after switching or at the predetermined interval; and
a processing unit configured to switch the plurality of images at the time interval selected by said selection unit, and display the plurality of images on the display device.

2. The apparatus according to claim 1, wherein when the difference between the time data corresponding to images before and after switching is smaller than a predetermined time, said selection unit selects the time interval based on the difference, and when the difference is not smaller than the predetermined time, selects the predetermined interval.

3. The apparatus according to claim 1, wherein when the time interval selected by said selection unit is changed while the plurality of images are switched and displayed one by one, said selection unit displays, on the display device, an indicator capable of discriminating a time period during which the plurality of images are displayed at the time interval based on the difference, and a time period during which the plurality of images are displayed at the predetermined interval.

4. The apparatus according to claim 1, wherein while the plurality of images are switched and displayed one by one, said selection unit displays, on the display device, an indicator indicating a change of the time interval by said selection unit.

5. The apparatus according to claim 1, wherein said selection unit selects a time interval based on a result of determining whether the images satisfy a predetermined condition, and when the result of the determination made repetitively is different from a previous result, interrupts switching of the plurality of images.

6. The apparatus according to claim 1, wherein said selection unit determines a time interval at which the images are switched, to display the plurality of images in a predetermined time.

7. The apparatus according to claim 1, wherein said selection unit determines, based on the number of images, a time interval at which the images are switched.

8. A display processing apparatus comprising:
an acquisition unit configured to acquire an image and a recording time from an image capture apparatus configured to capture an image;
a selection unit configured to select, as a time interval at which a plurality of images are switched and displayed one by one, one of a time interval based on a difference between recording times of images before and after switching, and a predetermined interval, and to display on a display device whether the plurality of images are switched and displayed at the time interval based on the difference between the recording times of images before and after switching or at the predetermined interval; and
a processing unit configured to switch the plurality of images at the time interval selected by said selection unit, and display the plurality of images on the display device.

9. The apparatus according to claim 8, wherein when the time interval selected by said selection unit is changed while the plurality of images are switched and displayed one by one, said selection unit displays, on the display device, an indicator capable of discriminating a time period during which the plurality of images are displayed at the time interval based on the difference, and a time period during which the plurality of images are displayed at the predetermined interval.

10. A display processing method comprising:
acquiring a plurality of images and time data corresponding to the respective images;
selecting, as a time interval at which the plurality of images are switched and displayed one by one, one of a time interval based on a difference between time data corresponding to images before and after switching, and a predetermined interval;
displaying on a display device whether the plurality of images are switched and displayed at the time interval based on the difference between the time data corresponding to images before and after switching or at the predetermined interval; and switching the plurality of images at the selected time interval to display the plurality of images on the display device.

11. The method according to claim 10, wherein when the difference between the time data corresponding to images before and after switching is smaller than a predetermined time, the time interval based on the difference is selected, and when the difference is not smaller than the predetermined time, the predetermined interval is selected.

12. The method according to claim 10, wherein when the time interval is changed while the plurality of images are switched and displayed one by one, an indicator capable of discriminating a time period during which the plurality of images are displayed at the time interval based on the difference, and a time period during which the plurality of images are displayed at the predetermined interval is displayed on the display device.

13. A display processing method comprising:
acquiring an image and a recording time from an image capture apparatus configured to capture an image;
selecting, as a time interval at which a plurality of images are switched and displayed one by one, one of a time interval based on a difference between recording times of images before and after switching, and a predetermined interval;
displaying on a display device whether the plurality of images are switched and displayed at the time interval based on the difference between the recording times of images before and after switching or at the predetermined interval; and
switching the plurality of images at the selected time interval to display the plurality of images on the display device.

14. The method according to claim 13, wherein when the time interval is changed while the plurality of images are switched and displayed one by one, an indicator capable of discriminating a time period during which the plurality of images are displayed at the time interval based on the difference, and a time period during which the plurality of images are displayed at the predetermined interval is displayed on the display device.

15. A non-transitory storage medium storing a computer program for display processing, the computer program including:
acquiring a plurality of images and time data corresponding to the respective images;
selecting, as a time interval at which the plurality of images are switched and displayed one by one, one of a time interval based on a difference between time data corresponding to images before and after switching, and a predetermined interval;
displaying on a display device whether the plurality of images are switched and displayed at the time interval based on the difference between the time data corresponding to images before and after switching or at the predetermined interval; and
switching the plurality of images at the selected time interval to display the plurality of images on the display device.

16. The medium according to claim 15, wherein when the time interval is changed while the plurality of images are switched and displayed one by one, an indicator capable of discriminating a time period during which the plurality of images are displayed at the time interval based on the difference, and a time period during which the plurality of images are displayed at the predetermined interval is displayed on the display device.

17. A non-transitory storage medium storing a computer program for display processing, the computer program including:
acquiring an image and a recording time from an image capture apparatus configured to capture an image;
selecting, as a time interval at which a plurality of images are switched and displayed one by one, one of a time interval based on a difference between recording times of images before and after switching, and a predetermined interval;
displaying on a display device whether the plurality of images are switched and displayed at the time interval based on the difference between the recording times of images before and after switching or at the predetermined interval; and
switching the plurality of images at the selected time interval to display the plurality of images on the display device.

18. The medium according to claim 17, wherein when the time interval is changed while the plurality of images are switched and displayed one by one, an indicator capable of discriminating a time period during which the plurality of images are displayed at the time interval based on the difference, and a time period during which the plurality of images are displayed at the predetermined interval is displayed on the display device.

* * * * *